G. G. C. FLINTERMANN.
WHEEL RACK AND LIFT.
APPLICATION FILED AUG. 6, 1919.

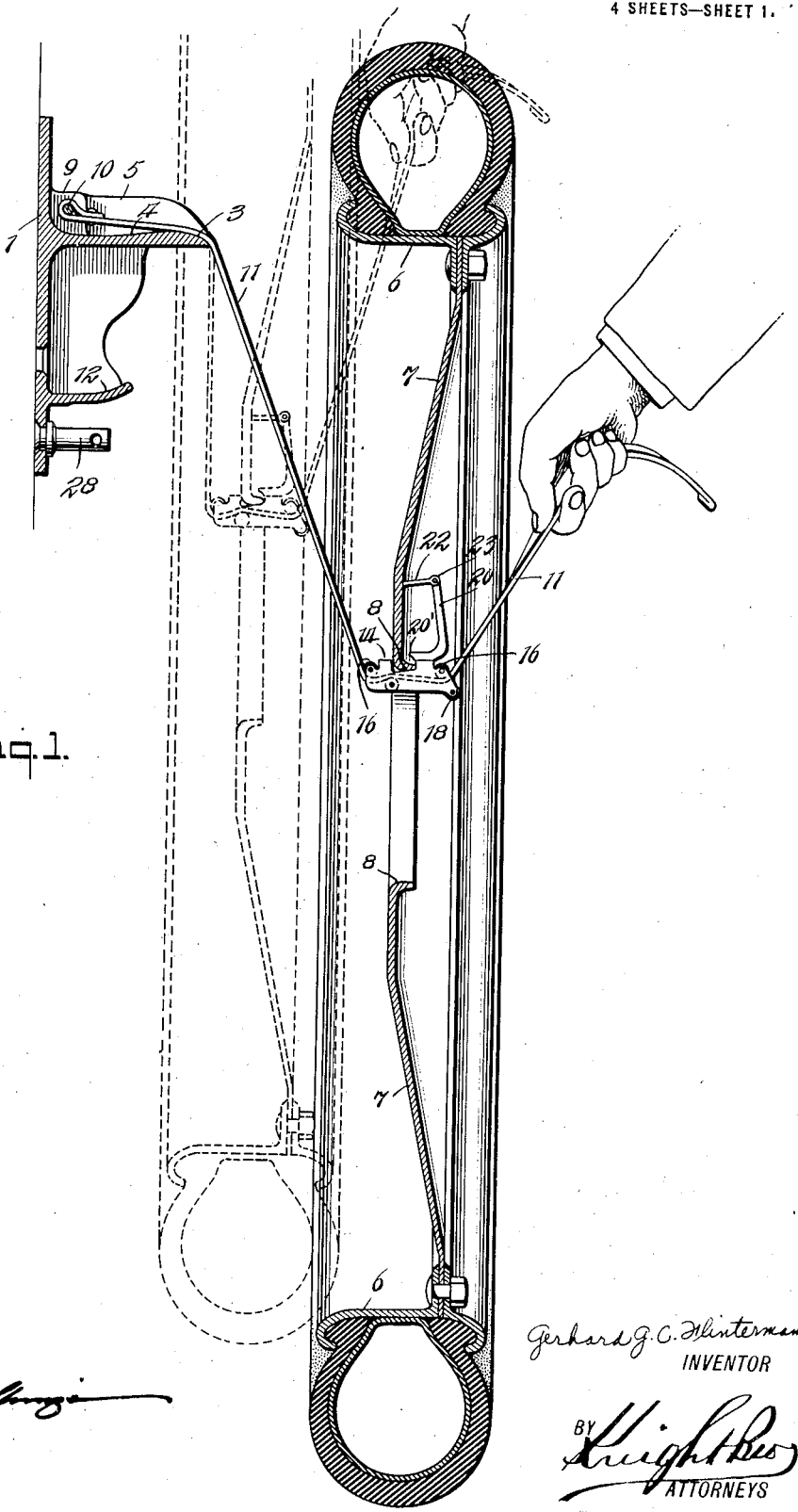

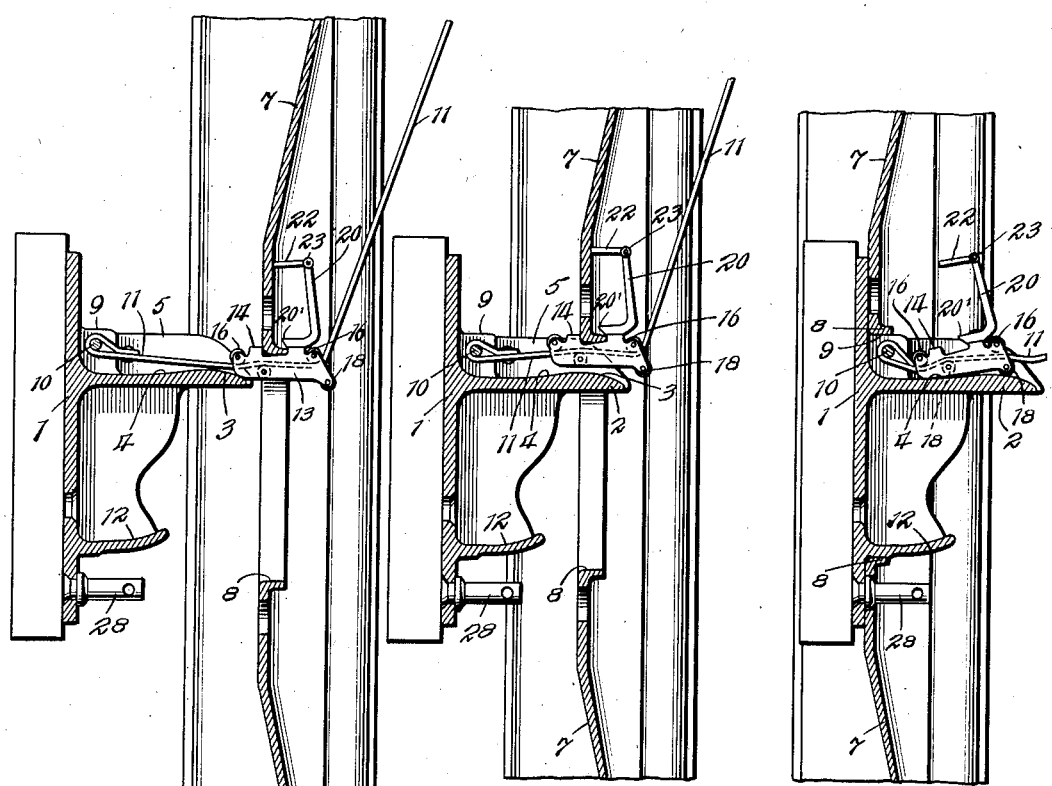
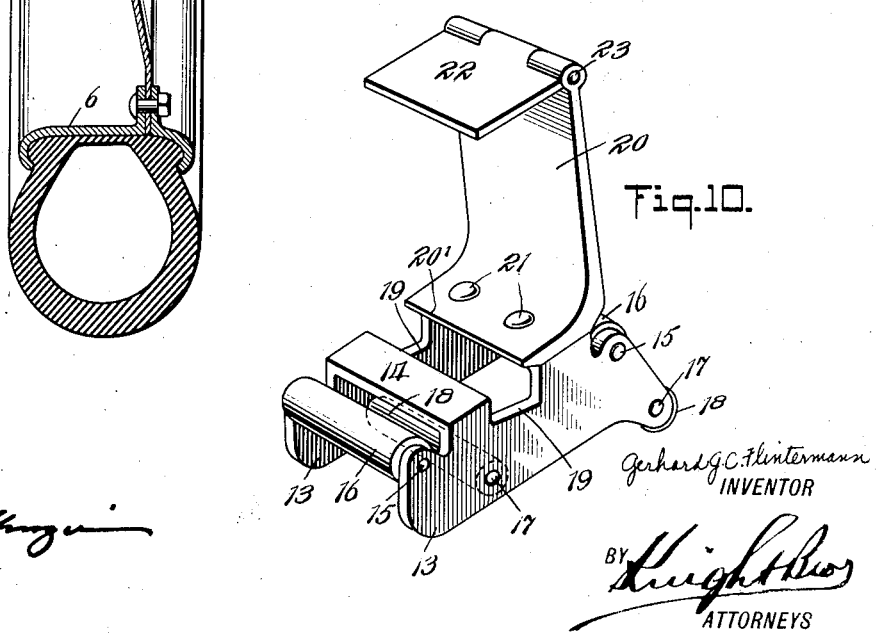

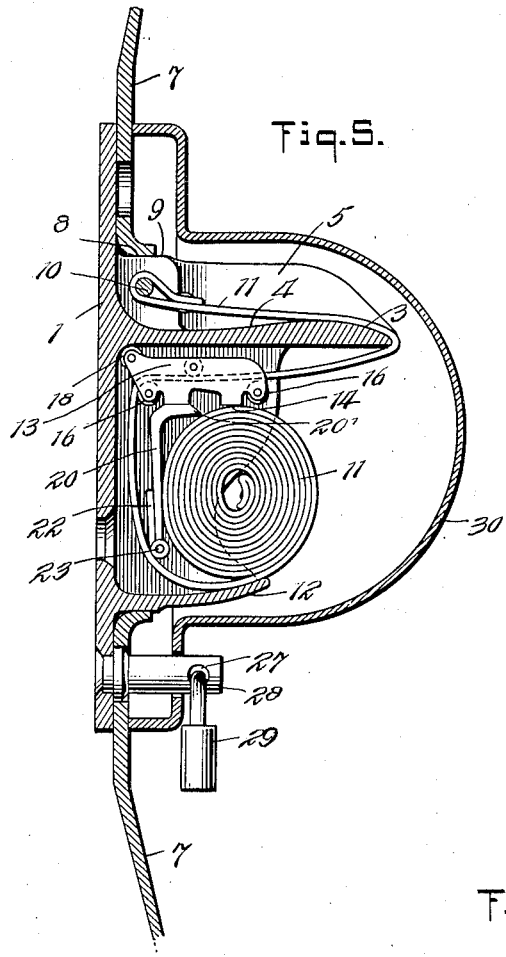
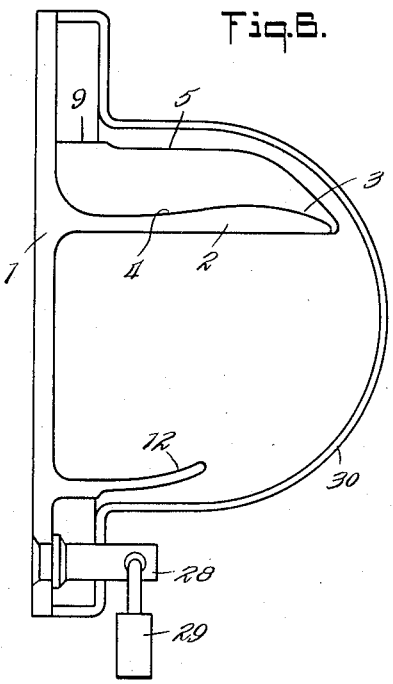
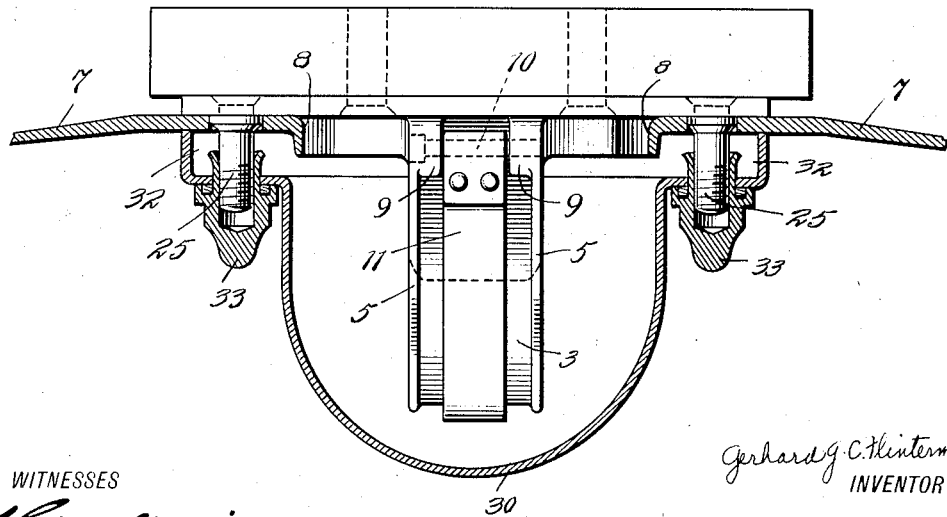

1,406,632.

Patented Feb. 14, 1922.

WITNESSES

Gerhard G. Flintermann
INVENTOR

BY
ATTORNEYS

UNITED STATES PATENT OFFICE.

GERHARD G. C. FLINTERMANN, OF NEW YORK, N. Y.

WHEEL RACK AND LIFT.

1,406,632.  Specification of Letters Patent.  Patented Feb. 14, 1922.

Application filed August 6, 1919. Serial No. 315,686.

*To all whom it may concern:*

Be it known that I, GERHARD G. C. FLINTERMANN, a citizen of the United States, residing in the city, county, and State of New York, have invented certain new and useful Improvements in Wheel Racks and Lifts, of which the following is a specification.

This invention relates more especially to lifts and racks for automobiles and primarily contemplates a device of this character suitable for use in connection with extra wheels which are commonly arranged in various positions about an automobile which is intended to travel long distances. One of the objects of my invention is to provide improved means for lifting automobile wheels to and from a rack which is designed to carry them when not in use. More especially, the invention contemplates a device suitable for use with heavy wheels such for example as those with webs of sheet metal or other heavy construction. Another object of the invention is to provide a carrier of improved construction for movably supporting a wheel as it is conveyed by gravity along a strap or band or similar conveyer which is preferably made flexible so that by having one end secured adjacent to the rack on which the wheel is to rest and its other end free said carrier can be made to travel along the flexible member by raising or lowering its free end. One of the objects of the present invention is to provide a wheel rack of improved construction which adapts it to cooperate with the carrier so as to deliver the wheel directly from said carrier on to the seat or shoulder where it is to be rigidly clamped by the cap or cover. A subordinate object of invention resides in the provision of suitable receptacles for storing the wheel carriage with the flexible member or strap when these elements are not in use. Other objects of invention will appear in the specification and be pointed out in the appended claims, reference being had to the accompanying drawings, in which—

Figure 1 is a side elevation of a preferred embodiment of my invention showing an early state of its operation, parts being shown in section;

Figure 2 is a similar view showing a later stage of the operation;

Figures 3 and 4 are similar views showing later stages;

Figure 5 is a vertical section of the wheel rack with the wheel in position thereon and the flexible member and wheel carriage stored within;

Figure 6 is a similar view showing the relative positions of the parts with the wheel removed;

Figure 7 is a top plan view of the parts within the housing, the wheel web and other parts being shown in section;

Figure 10 is a perspective view of the same.

Figure 8:
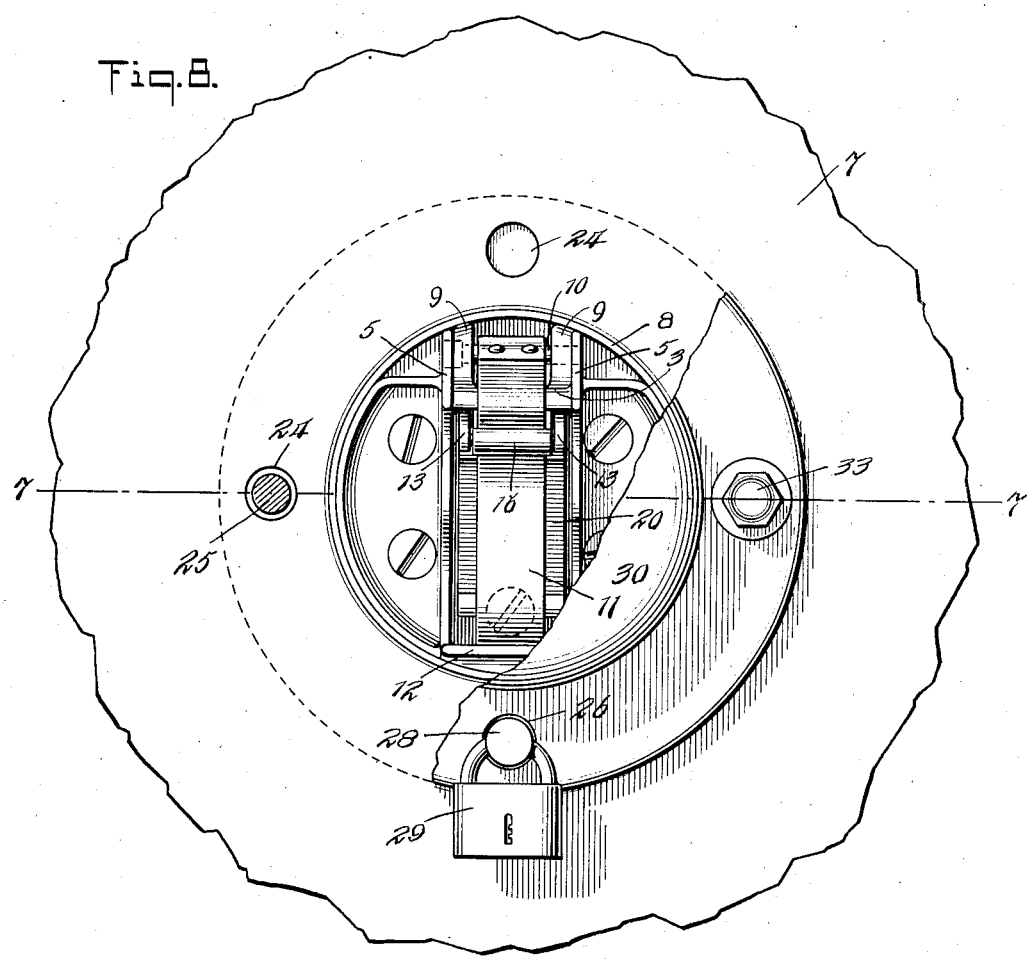
Figure 8 is a front elevation of the same with the cover broken away and parts shown in section.

According to the embodiment of my invention shown on the drawings, the fixed wheel support or rack comprises a base plate 1 by means of which said support or rack may be mounted in any suitable position such as on an automobile for example. Presented outwardly from the base plate 1, is a shelf or bracket 2 of which the upper surface is inclined downwardly and outwardly at 3 and provided with a depression 4 adjacent said base plate 1 (see Figures 5, 6, and 7). Lateral flanges 5 which are formed integral with the shelf or bracket 2, are reduced in height at their outer ends so as to present no undue obstruction to the wheel as it is moved into position on the rack. My invention as shown on the drawings, is adapted for use in connection with wheels of the type shown best in Figure 1, and in which the tire supporting rim 6 carries a steel web 7 provided with a laterally deflected flange 8 whereby it is adapted to be mounted on the hub which usually remains undisturbed on the car axle. The rounded corner of the flange 8 is adapted to fit into the angle between the base plate 1 and a pair of laterally spaced seats or shoulders 9 which as shown in Figures 5, 6 and 7, are arranged as broadened and raised continuations of the lateral flanges 5. Extending across the space between the seats or shoulders 9, is a pin or bar 10 about which is looped one end of a flexible member such as a band or strap 11. As shown in Figures 5 and 7, the strap 11 extends over the shelf 2 between the flanges 5, its free end being coiled into a recess or receptacle formed between the shelf 2 and an upwardly deflected plate 12 upon which the coiled strap is supported. Movably suspended from the strap 11, is a support or carriage which in its preferred form is best shown detached in Figure 10. Said movable support or carriage comprises side plates 13 which are rigidly united by integral cross bars 14 and between which side plates are carried two upper pins 15 upon which are journaled anti-friction rollers 16, and lower pins 17 upon which are journaled anti-friction rollers 18. The side plates 13 are provided with notches 19 in their upper edges to form a recess for receiving the flange 8 of the wheel. A standard 20 is provided with a foot secured by rivets 21 to one of the cross bars 14. Said foot slightly overhangs the notches 19, 19 and is adapted to interlock with the flange 8 to prevent the wheel tilting in one direction while it is being conveyed to the rack. Suitable means for preventing a tilting movement in the opposite direction is provided by a plate 22 which is hinged by a pintle 23 to the upper end of the standard 20. As shown best in Figures 1 and 2, after the flange 8 has been seated in the notches 19, 19, the plate 22 is thrown over into operative position shown in Figures 1, 2 and 9 to engage the web 7. It thus serves as a strut which more or less holds the wheel rigidly vertical by reason of flange 8 being thrown into abutment with the overhanging edge of the foot of standard 20. The usual construction for wheels of the type shown in connection with my invention, provides four bolt holes 24 by means of which they may be bolted to the hubs journaled on the automobile axles. The base plate 1 of the wheel rack carries two outwardly presented studs 25 arranged in a common horizontal plane and spaced to correspond to two diametrically opposed holes 24 in the wheel web (see Figures 7 and 8). A third stud 26 is arranged to pass through another one of the holes 24 in said web and is provided near its outer end with a hole 27 through its diameter to receive the shank 28 of a lock 29 which serves to prevent the unauthorized removal of a cap or closure 30 which is provided with holes suitably spaced to register with the studs 25, 25 and 26. Preferably the cap or closure 30 is substantially hemispherical in form for adapting it to form a closure for the receptacle which contains the coiled strap and carriage when not in use. Said cap or closure is provided with a flat annular portion 31 within which are formed the holes corresponding to studs 25, 25 and 26 and a peripheral flange 32 which in the present embodiment of my invention, conforms to the periphery of the base plate 1. Threaded to the outer ends of the studs 25, 25, are the nuts 33 which serve to draw the peripheral flange 32 into clamping engagement with the web 7 of the wheel. The operation of my invention will now be readily understood and briefly described, is as follows.

Figure 9:
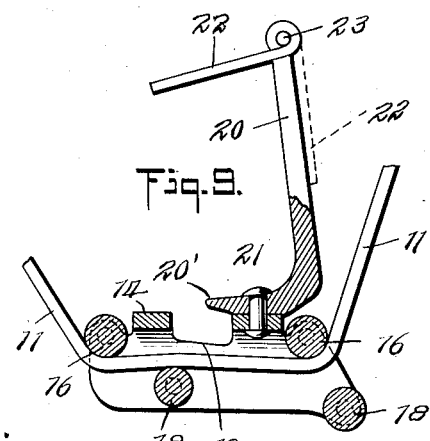
Figure 9 is a vertical section of the movable wheel support or carriage, parts being broken away and parts shown in side elevation.

In the case of wheels of comparatively small weight, the flexible member or strap 11 may be passed through the hub portion of a wheel and elevated without the use of the carriage until such portion strikes the guides or flanges 5 over which the wheel is slid until finally deposited upon the seat 9. This procedure may also be followed out with a relatively heavy wheel such as that shown on the drawings but preferably, the carriage shown in Figures 9 and 10 is applied to the upper side of the web flange 8 with said flange seated in notches 19, 19, in the side plates 13, 13, the free end of strap 11 having first been passed between upper rollers 16 and lower rollers 18. After the plate or strut 22 has been thrown into positive engagement with the web of the wheel, which serves to lock the flange 8 under the projecting edge 20' of standard 20 and to hold the wheel in upright position, the free end of the strap is raised in such a way as to cause the carriage and wheel to coast toward the fixed support or rack. The wheel is thus caused to be moved from solid to dotted line positions shown in Figure 1. Toward the end of its upper movement toward the wheel rack, the rounded corners of the side plates 13, 13, come into engagement with the outwardly inclined edge 3 of the shelf or bracket 2 as seen in Figure 2 which enables the wheel to be further lifted along the outwardly inclined upper edges of the guides or flanges 5, 5. For this purpose, the carriage may be warped up the inclined surface while at the same time shoving the wheel itself toward the rack. In this way the wheel is brought into the position shown in Figure 3 when the wheel is supported entirely on the guides or flanges 5, 5. The wheel may now be warped toward the base plate 1 over the guides or flanges 5 and up on to the seats 9, 9 as shown in Figure 4. During this final movement, the carriage is left free to release itself from the flange 8 and therefore settles into the recess 4. The closure 30 may now be adjusted and secured in position to lock the wheel on the fixed support or rack, the lock 29 being applied when desirable.

I claim:

1. The combination with a wheel rack, of a flexible conveyer secured at one end to said rack and having its other end free to be passed under that portion of a wheel which is to be seated on said rack.

2. The combination with a wheel rack provided with a seat upon which a wheel is adapted to rest, of a flexible strap secured at one to said rack adjacent said seat and having its other end free to be passed under that portion of a wheel which is to be seated on said seat.

3. The combination with a wheel rack provided with a seat upon which a wheel is adapted to rest, of a flexible strap secured at one end to said rack adjacent said seat and having its other end free to be passed under that portion of a wheel which is to be seated on said seat said rack being provided with means for guiding a wheel upwardly above the point where the wheel is first brought into engagement with said rack and onto said seat.

4. The combination with a wheel rack provided with a seat and laterally spaced guide flanges extending outwardly from said seat and downwardly, of a flexible member having one end secured to said rack adjacent to said seat and extending between said guide flanges.

5. The combination with a wheel rack provided with a seat and laterally spaced guide flanges extending outwardly from said seat and downwardly, of a flexible member having one end secured to said rack adjacent to said seat and extending between said guide flanges.

6. In a device of the character described, the combination with a wheel support of means adapted to engage the inner peripheral edge of a web wheel for movably supporting said wheel as it is conveyed to and from said support, said wheel support being provided with a seat for seating said inner peripheral edge of the web wheel.

7. In a device of the character described, the combination with a wheel support of means adapted to engage the inner peripheral edge of a web wheel for movably supporting said wheel as it is conveyed to and from said support, said wheel support being provided with a seat for seating said inner peripheral edge of the web wheel, and a flexible member secured at one end to said fixed wheel support and having its other end free to be raised or lowered relatively thereto for coasting said engaging means to and from said support.

8. The combination with a fixed wheel support carried by an automobile, of a flexible member secured at one end to said support, and a movable wheel support adapted to coast along said flexible member and adapted to convey a wheel to said fixed support when the free end of said flexible member is elevated and to convey a wheel from said fixed support when said free end of the flexible member is lowered.

9. The combination with an automobile, of a fixed wheel support mounted thereon, a strap secured at one end to said support and free at its other end, and a wheel supporting carriage movably connected to said strap to travel by gravity toward and away from said fixed wheel support.

10. In a device of the character described, a fixed wheel support provided with a seat for a hub portion of a wheel, a flexible member fixed at one end adjacent said wheel support and having its other end free, and wheel engaging means movably mounted on said flexible member and adapted to convey said wheel into position to have said hub portion rest on said seat.

11. In a device of the character described, a fixed wheel support provided with a seat for a hub portion of a wheel, a flexible member fixed at one end adjacent said wheel support and having its other end free, and a movable wheel support traveling on said flexible member, said movable wheel support being provided with a seat for said wheel hub portion which is movable into and out of register with the seat on said fixed wheel support.

12. In a device of the character described, a fixed wheel support provided with a seat for a hub portion of a wheel, a flexible member fixed at one end adjacent said wheel support and having its other end free, and a movable wheel support traveling on said flexible member, said movable wheel support being provided with a seat for said wheel hub portion which is movable into and out of register with the seat on said fixed wheel support, said movable wheel support being provided with means for retaining a wheel in substantially vertical position during the travel of said movable support to and from said fixed support.

13. In a device of the character described, a fixed wheel support provided with a seat for a hub portion of a wheel, a flexible member fixed at one end adjacent said wheel support and having its other end free, and a movable wheel support traveling on said flexible member, said movable wheel support being provided with a seat for said wheel hub portion which is movable into and out of register with the seat on said fixed wheel support, said fixed support having a storage receptacle for said flexible member and movable support.

14. In a device of the character described, a fixed wheel support provided with a seat for a hub portion of a wheel, a flexible member fixed at one end adjacent said wheel support and having its other end free, and a movable wheel support traveling on said flexible member, said movable wheel support being provided with a seat for said wheel hub portion which is movable into and out of register with the seat on said fixed wheel support, said fixed wheel support being provided with a removable cover and means for holding said cover in clamping engagement with a wheel seated on said fixed support wheel seat.

15. In a device of the character described, a fixed wheel support provided with a seat for a hub portion of a wheel, a flexible member fixed at one end adjacent said wheel support and having its other end free, and a movable wheel support traveling on said flexible member, said movable wheel support being provided with a seat for said wheel hub portion which is movable into and out of register with the seat on said fixed wheel support, said movable wheel support being provided with means for retaining a wheel in substantially vertical position during the travel of said movable support to and from said fixed support, said fixed support having a cover for closing said receptacle, said cover being provided with flanges adapted to co-operate with adjacent portions of said fixed wheel support for clamping a wheel in position thereon.

16. In a device of the character described, a traveling carrier for automobile wheels comprising a body provided with a recess for receiving a hub portion of a wheel, a standard adjacent to said recess, and a strut movable on said standard into and out of engagement with a wheel seated in said recess.

17. In a device of the character described, the combination with a wheel support of means adapted to engage the inner peripheral edge of a web wheel for movably supporting said wheel as it is conveyed to and from said support, said wheel support being provided with a seat for seating said inner peripheral edge of the web wheel, and means connected to said wheel support for clamping the web of said wheel adjacent to said inner peripheral edge.

18. In a device of the character described, a wheel support, a carriage for said wheel, and means for moving said carriage into and out of position to permit said wheel to be transferred from said carriage to said support and from said support to said carriage, said support being provided with a seat for receiving that portion of the wheel which rests on said carriage.

19. In a device of the character described, the combination with a wheel support of means adapted to engage the inner peripheral edge of a web wheel for movably supporting said wheel as it is conveyed to and from said support, said wheel support being provided with a seat for seating said inner peripheral edge of the web wheel, and means connected to said wheel support for clamping the web of said wheel adjacent to said inner peripheral edge, said clamping means comprising a cover for a receptacle for the reception of said flexible member, said cover being provided with a flange adapted for clamping engagement with the web of said wheel.

20. The combination with a wheel rack, of a flexible member secured at one end to said wheel rack, a wheel carrier movable along said flexible member, said wheel rack being provided with a receptacle for said flexible member and carriage, and a closure for said receptacle.

21. The combination with a wheel rack, of means for conveying a wheel to and from said wheel rack, including a strap secured at one end to said wheel rack, and a carriage running on said strap, said carriage comprising spaced side plates and rollers journaled between said side plates and running on said strap, a standard mounted on said side plates and provided with a strut, said side plates being provided with notches for seating a hub portion of a wheel and co-operating with said strut to hold the wheel vertical.

22. A wheel carriage provided with spaced rollers adapting it to travel along a flexible member and an upwardly presented recess for seating the hub flange of a wheel, said carriage having a projection overhanging said recess for interlocking with said hub flange, a standard, and a movable strut adapted to hold said wheel with its hub flange in interlocking engagement with said projection.

23. In a device of the character described, a wheel support and a flexible member adapted to receive a wheel in a bight formed in said flexible member, said flexible member having one end secured to said support and its other end free to be passed through said wheel.

24. A carriage for wheels provided with means adapted to have interlocking engagement with one portion of a wheel, and means mounted on said carriage and movable into and out of engagement with another portion of said wheel for holding said wheel positively secured between said interlocking means and said movable engagement means, said carriage being provided with oppositely disposed rollers for adapting said carriage to be constrained in its movement by a strap or the like passing between said rollers.

25. The combination with a wheel rack provided with a wheel supporting seat and spaced guides or flanges extending from said seat, a strap having one end secured to said rack between said guides or flanges, and a wheel carriage adapted to move along said strap into a position between said guides or flanges and in suitable relation to said seat to have a wheel shifted to and fro between said carriage and wheel supporting seat.

26. In a device of the character described, an elevated support provided with a wheel seat, and a flexible member secured at one end to the support adjacent said wheel seat and having a free end adapted to be passed under that portion of a wheel which is to be seated on said wheel seat.

27. In a device of the character described, a fixed wheel support provided with a carriage recess and a seat adjacent thereto, a flexible member secured at one end to said support and having its other end free, and a wheel carriage adapted to run along said flexible member into said recess.

GERHARD G. C. FLINTERMANN.